United States Patent [19]

Nakashima et al.

[11] Patent Number: 4,926,253
[45] Date of Patent: May 15, 1990

[54] MULTI-COLOR DOCUMENT READING APPARATUS FOR FACSIMILE AND MULTI-COLOR FACSIMILE

[75] Inventors: Keisuke Nakashima, Hitachi; Saburo Yasukawa, Katsuta; Masaharu Tadauchi, Mito; Yasuro Hori, Katsuta, both of Japan

[73] Assignee: Hitachi, Ltd., Tokyo, Japan

[21] Appl. No.: 319,970

[22] Filed: Mar. 6, 1989

[30] Foreign Application Priority Data

Mar. 7, 1988 [JP] Japan ................................ 63-51495

[51] Int. Cl.⁵ .............................................. H04N 1/46
[52] U.S. Cl. ............................................ 358/75; 358/80
[58] Field of Search ......................... 358/78, 79, 75, 80

[56] References Cited

U.S. PATENT DOCUMENTS

| | | | |
|---|---|---|---|
| 4,591,905 | 5/1986 | Noguchi | 358/75 |
| 4,652,913 | 3/1987 | Saitoh | 358/75 |
| 4,679,073 | 7/1987 | Hayashi | 358/75 |
| 4,718,768 | 1/1988 | Houki | 358/75 |
| 4,809,061 | 2/1989 | Suzuki | 358/75 |
| 4,812,900 | 3/1989 | Kadowaki et al. | 358/75 |

FOREIGN PATENT DOCUMENTS

| | | |
|---|---|---|
| 59-126368 | 7/1984 | Japan . |
| 59-189775 | 10/1984 | Japan . |
| 60-94576 | 5/1985 | Japan . |
| 61-74447 | 4/1986 | Japan . |
| 61-191168 | 8/1986 | Japan . |

OTHER PUBLICATIONS

Image Signal Processing LSI for Fax, IECE at Japan, vol. J68-B, No. 1, pp. 53-60.

Primary Examiner—James J. Groody
Assistant Examiner—Jerome Grant, II
Attorney, Agent, or Firm—Antonelli, Terry, Stout & Kraus

[57] ABSTRACT

A multi-color document reading apparatus used in a facsimile apparatus for reading a document disposed at a predetermined position containing pictures of multiple colors on a line-by-line basis while discriminately identifying the colors includes an image sensor for sensing optical images in a predetermined area including at least one line of the document disposed at the predetermined position, light sources for selectively illuminating at least the predetermined area in one of first and second energized states differing from each other in respect to the spectral characteristics thereof, a switch circuit for selectively energizing the light sources for illuminating the document in one of the first and second states, a distortion correcting circuit including memories for storing first and second shading waveforms derived from data sensed by the image sensor for optical images of a standard sheet of a specific color disposed at the predetermined position and illuminated by the light source in the first and second energized states, respectively, and a color separating circuit for identifying data of different colors of the multi-color pictures included in one line of the document for generating color-separated signals representing the different colors.

25 Claims, 19 Drawing Sheets

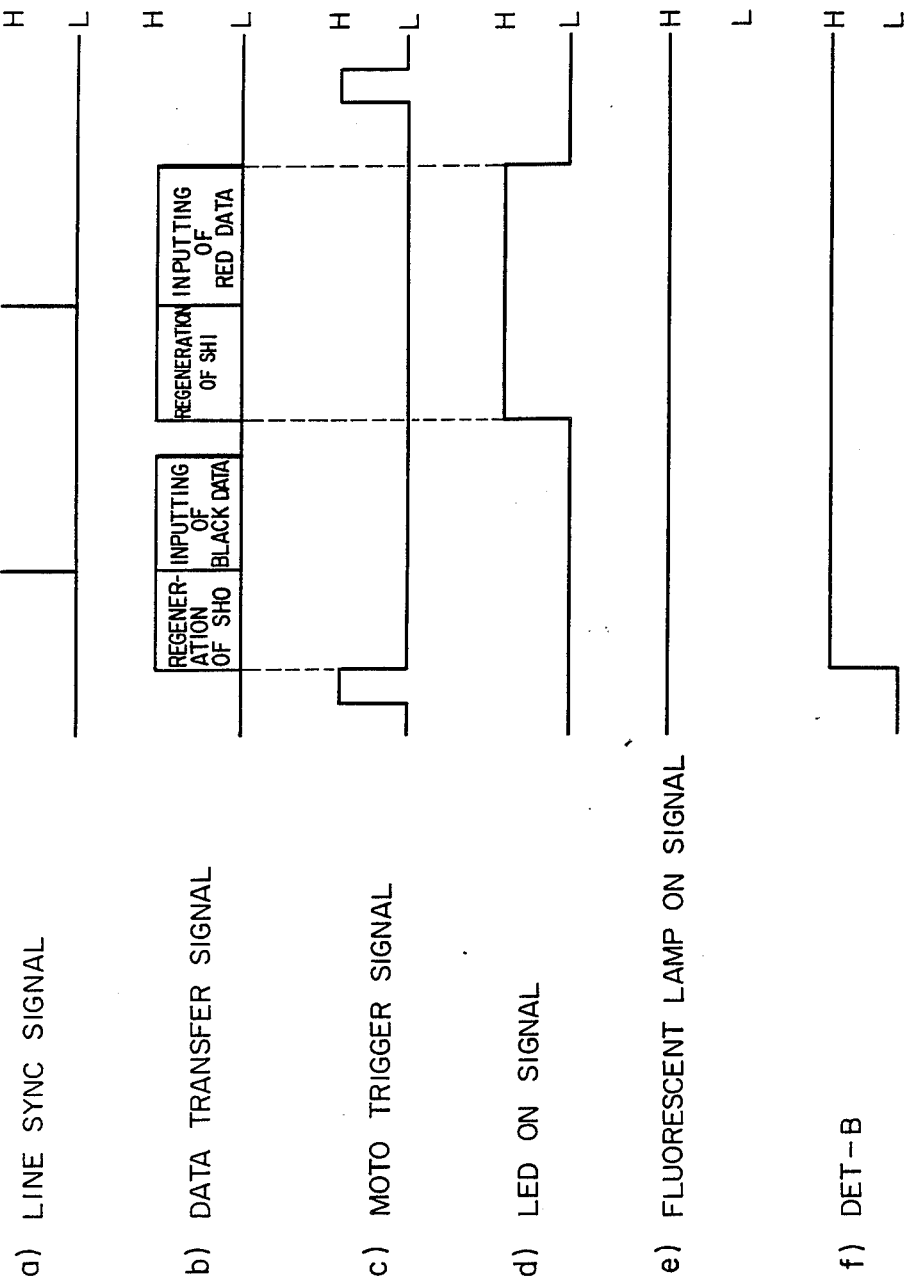

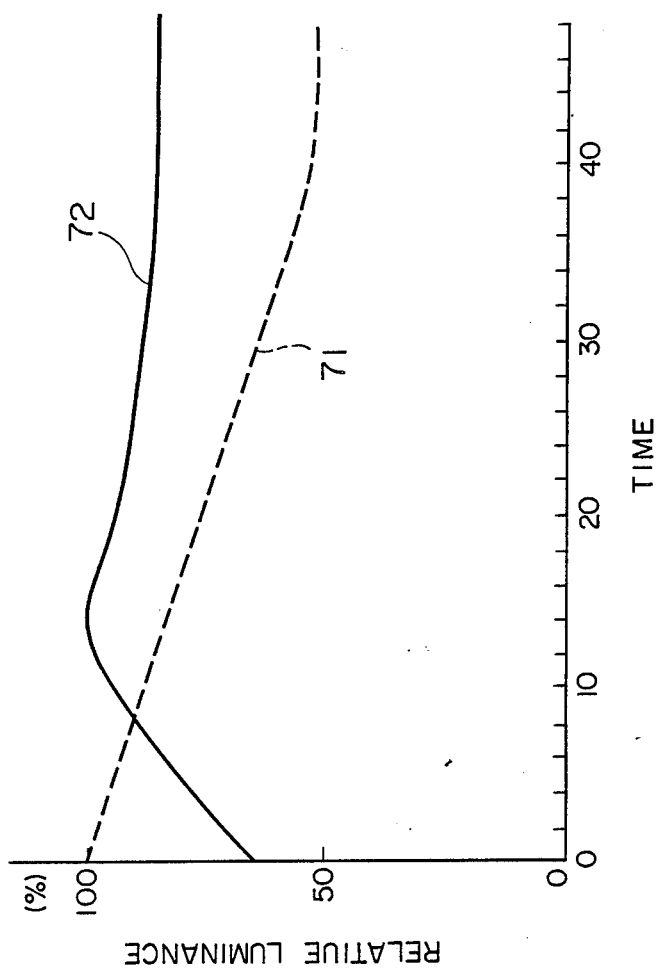

MULTI-COLOR DOCUMENT READING APPARATUS FOR FACSIMILE AND MULTI-COLOR FACSIMILE

BACKGROUND OF THE INVENTION

1. Field of the Invention

The present invention generally relates to a facsimile system for electrically transmitting document data and more particularly to document reading apparatus, facsimile equipment and LSI circuits suited for processing multi-colour document data.

2. Description of the Related Art

A system for reading colour pictures by using a plurality of light sources having different spectral characteristics has already been proposed, as disclosed in No. JP-A-59-189775. Also, a colour picture reading system has been proposed in which at least one of the light sources is continuously energized throughout the entire period during a reading operation is performed.

In a two-colour facsimile system typical of multi-colour facsimiles known heretofore, transmission schemes differ from one to another depending on the manufacturer because the standards therefor have not yet been established.

There is also known a shading correction system in which a standard or reference sheet for colour detection or identification is made use of, as described in No. JP-A-61-74447.

Further, a distortion correcting LSI circuit has also been proposed, as disclosed in No. JP-A-60-94576.

It is noted, however, that in the colour document reading apparatus of the prior art, no consideration has been made of the fact that a plurality of light sources having different spectral characteristics exhibit different behaviours with respect to variation in the quantity of light emitted over time as well as in dependence on temperature, thus giving rise to a problem in that erroneous colour identification might undesirably be made due to erroneous operation of a colour separation circuit.

Also, in the multi-colour facsimile systems known heretofore, no measures have been taken concerning the possibility of distinction between different colours by displaying them with correspondingly different monochromatic patterns such as black and white patterns, as required in the case of communication with the conventional monochromatic G2, G3 or G4 facsimiles. Consequently, transmission of multi-colour document data is possible only with multi-colour facsimile apparatus equipped with a multi-colour recording apparatus and is very inconvenient.

It is further noted that the distortion correcting circuit of the prior art requires a relatively large number of peripheral circuits because the distortion correcting LSI for a monochromatic facsimile is employed.

According to the prior art distortion correcting method, a reference signal for correction has to be inputted before the document is read. Consequently, control can not follow up changes in the distortion characteristics taking place in the course of reading a document, thus presenting a further problem.

SUMMARY OF THE INVENTION

A first object of the present invention is to provide a document reading apparatus for facsimile equipment in which erroneous colour identification or discrimination for colour separation due to variation the quantity of light emitted by light sources in over time and/or with a temperature can positively be excluded.

A second object of the present invention is to provide a facsimile system wherein when multi-colour document data are to be transmitted to a conventional monochromatic facsimile apparatus, the different colour data are transmitted as the signals capable of representing the different colours in terms of correspondingly different monochromatic patterns.

A third object of the present invention is to provide a distortion correcting LSI circuit for use in a multi-colour facsimile which can be implemented in a simplified circuit configuration for correcting a shading distortion.

A fourth object of the present invention is to provide a multi-colour facsimile system equipped with an apparatus capable of inputting a correction reference signal for the shading correction in the course of a document reading operation.

The first object of the present invention mentioned above can be achieved by a multi-colour document reading apparatus including means for detecting variation or change in the quantity of light emitted by illuminating light sources having different spectral characteristics, wherein the variation in the light quantity is utilized as a control parameter for the colour separation.

The second mentioned object of the present invention can be achieved by providing a multi-colour facsimile system imparted with an operation mode for transmitting multi-colour document data by synthesising such data to monochromatic patterns corresponding to respective colours upon transmission to a conventional monochromatic facsimile in addition to a mode of transmitting multi-colour document data in the form of separated colour signals.

In view of the third object of the present invention mentioned above, the distortion correcting LSI circuit is implemented so as to store a plurality of shading waveforms which are regenerated individually and separately through switching means.

In view of the fourth object of the present invention mentioned above, data for reference colour is additionally provided on a distortion correcting sheet or plate at a location outside of a region where the document is to be read.

The means for detecting the change in the quantity of illumination at the document reading portion continues to detect the quantity of light throughout the document reading period. Accordingly, even when the quantity of light changes in the course of reading a sheet of document, the colour separation circuit can be protected against erroneous operation, whereby colour identification can be realized with high reliability and certainty.

Further, in a case of communication between a multi-colour facsimile apparatus and a monochromatic facsimile apparatus such as black and white facsimile apparatus the discriminated colour data are synthesised into a monochromatic code signal for transmission. Thus, the problem from which the prior art multi-colour facsimile apparatus suffers can be solved satisfactorily.

Since the distortion correcting LSI circuit can store reference shading waveforms for the shading correction of red and black data, respectively, the necessity for repeatedly applying a number of reference shading waveforms is eliminated, and thereby the processing time can correspondingly be reduced while the number of external circuits required can be decreased.

BRIEF DESCRIPTION OF THE DRAWINGS

FIG. 3 is a timing chart illustrating a reading process carried out on a line-by-line basis by the reading apparatus according to the invention;

FIG. 7 is a diagram for graphically illustrating variation in luminance of two different light sources employed for discriminatively identifying different colours in the course of time lapse immediately following the energization of the light sources;

DESCRIPTION OF THE PREFERRED EMBODIMENTS

Figure 1:
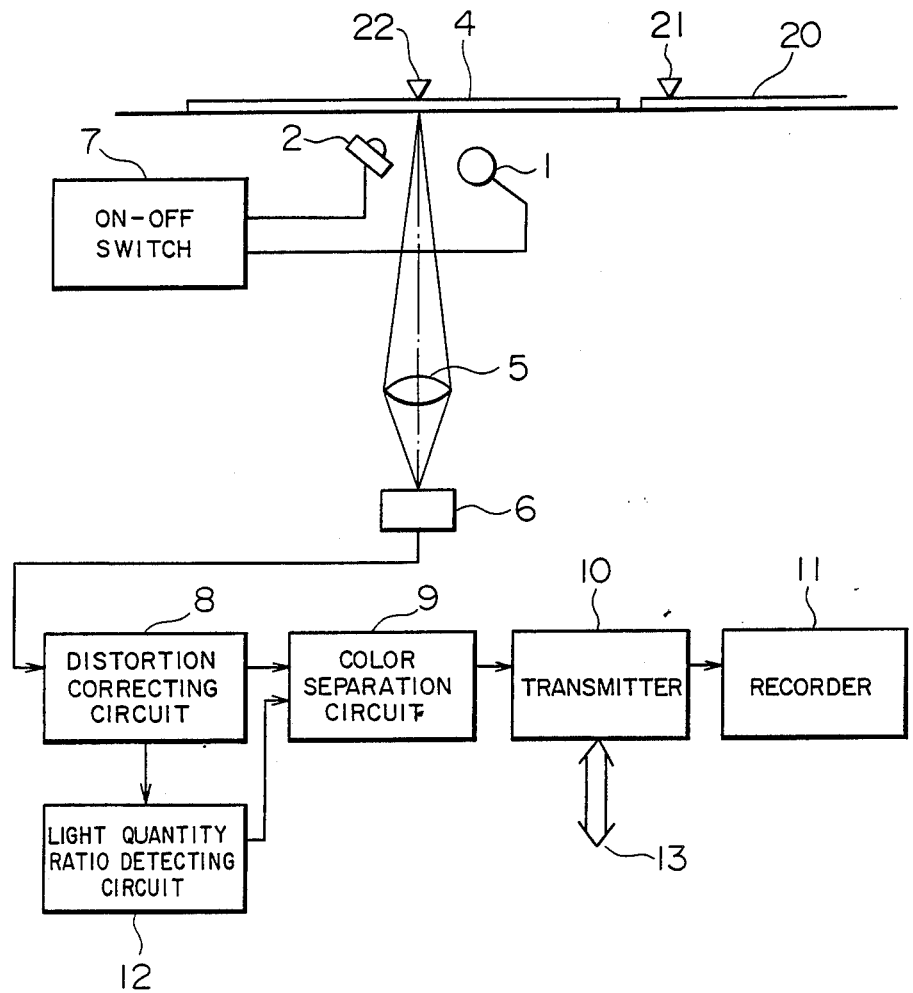
FIG. 1 is a block diagram showing a general arrangement of a multi-colour document reading apparatus according to an exemplary embodiment of the present invention.

Now, the present invention will be described in conjunction with exemplary embodiments thereof on the assumption, by way of example, that the document whose image data to be processed is prepared in two colours, i.e. red and black. Referring to FIG. 1, a predetermined region of a document 4 carrying colour information and disposed at a predetermined reading position is illuminated by means of two sources having different spectral characteristics such as, for example, a light emission diode (LED) array 2 and a fluorescent lamp 1, whereby a light or optical image of the above-mentioned predetermined region of the document 4 is focused onto an image sensor 6 through a lens 5. The LED array 2 is turned on and off at a timing corresponding to a one-line reading period by an on/off switch circuit 7, as will hereinafter be described in more detail.

A distortion correcting circuit 8 performs correction of distortion and digitization of the signal outputted from the image sensor 6, the output signal of the distortion correcting circuit 8 being then supplied to both a colour separation circuit 9 and a light quantity ratio detecting circuit 12. In the light quantity ratio detecting circuit 12, the ratio of the quantity of light between the fluorescent lamp 1 and the LED array 2 is arithmetically determined on the basis of the quantity of light available from illumination with only the fluorescent lamp 1 and the quantity of light available when both of the fluorescent lamp 1 and the LED array 2 are simultaneously turned on for the illumination. The result of the arithmetic operation executed by the light quantity ratio detecting circuit 12 is supplied to the colour separation circuit 9.

In the colour separation circuit 9, colour signals corresponding to black and red are detected and discriminated on the basis of the data supplied from the distortion correcting circuit 8 and the result of the arithmetic operation performed by the light quantity ratio detecting circuit 12, whereupon both the colour signals are separated from each other. The signals resulting from the colour separation are coded by a transmitting unit 10 to be transmitted externally by way of a transmission path 13 such as a telephone line. In this transmission, the red colour signal and the black colour signal separated from each other on a line-by-line basis are transmitted in series. Alternatively, the red and black colour signals may be transmitted in series in a packet corresponding to a predetermined number of lines on the document or in number of such packets.

The colour signal incoming from other facsimile equipment is decoded in the transmitting/receiving unit 10, the results of the decoding being recorded by a recorder 11.

Figure 14:
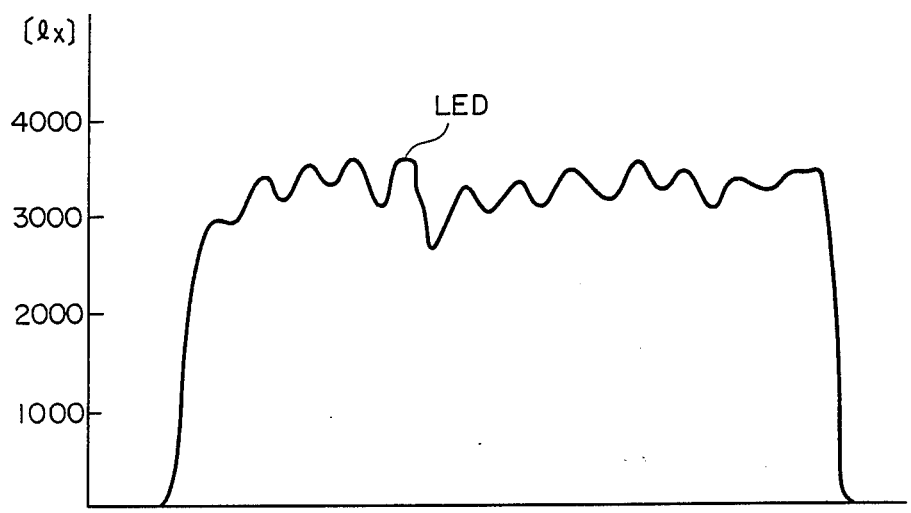
FIG. 14 is a view illustrating a shading waveform of a LED array.

According to one of the features of the present invention, changing-over of shading waveforms is taught because light sources (i.e. the fluorescent lamp and the LED array) are employed which result in remarkable differences in the shading waveform. At this juncture, the term "shading" should be elucidated. In the photoelectric conversion of a picture, low-frequency noise is contained in the picture or video signal resulting from the photo-electric conversion because of various factors such as nonuniformity in luminance of the illuminating light sources used for reading the document, lowering of peripheral luminous intensity brought about by the lens system and/or nonlinearity in the sensitivity of the image sensor. Such low-frequency noise is referred to as the shading or shading waveform. The shading not only assumes different waveforms in dependence on the types of the light sources but also varies even when one and the same light source is used as a function of time that has elapsed immediately following the turn-on of the light source. Accordingly, a reference shading waveform used for eliminating error ascribable to the shading effect should preferably be corrected with an appropriate timing. An example of the shading waveform in a picture signal obtained by using an LED illumination is illustrated in FIG. 14. The shading waveform resulting from the illumination with a fluorescent lamp is of a smooth drum-like form. However, since the luminous intensity of the fluorescent lamp is about ten times as high as that of the LED array, the synthesized shading waveform produced when both the fluorescent lamp and the LED are simultaneously lit assumes a waveform in which saw waves having small amplitude and a short period are superposed on the drum-like shading waveform produced upon illumination with the fluorescent lamp, as shown in FIG. 14.

It is possible to cope with the noise or shading waveform through a level adjustment with the aid of only one type of reference shading waveform when fluorescent lamps of different colours are used. However, when the LED array is used as the illuminating light source in combination with the fluorescent lamp, it is desirable to prepare a plurality of reference shading waveforms and to change them over at an appropriate timing.

Figure 2:
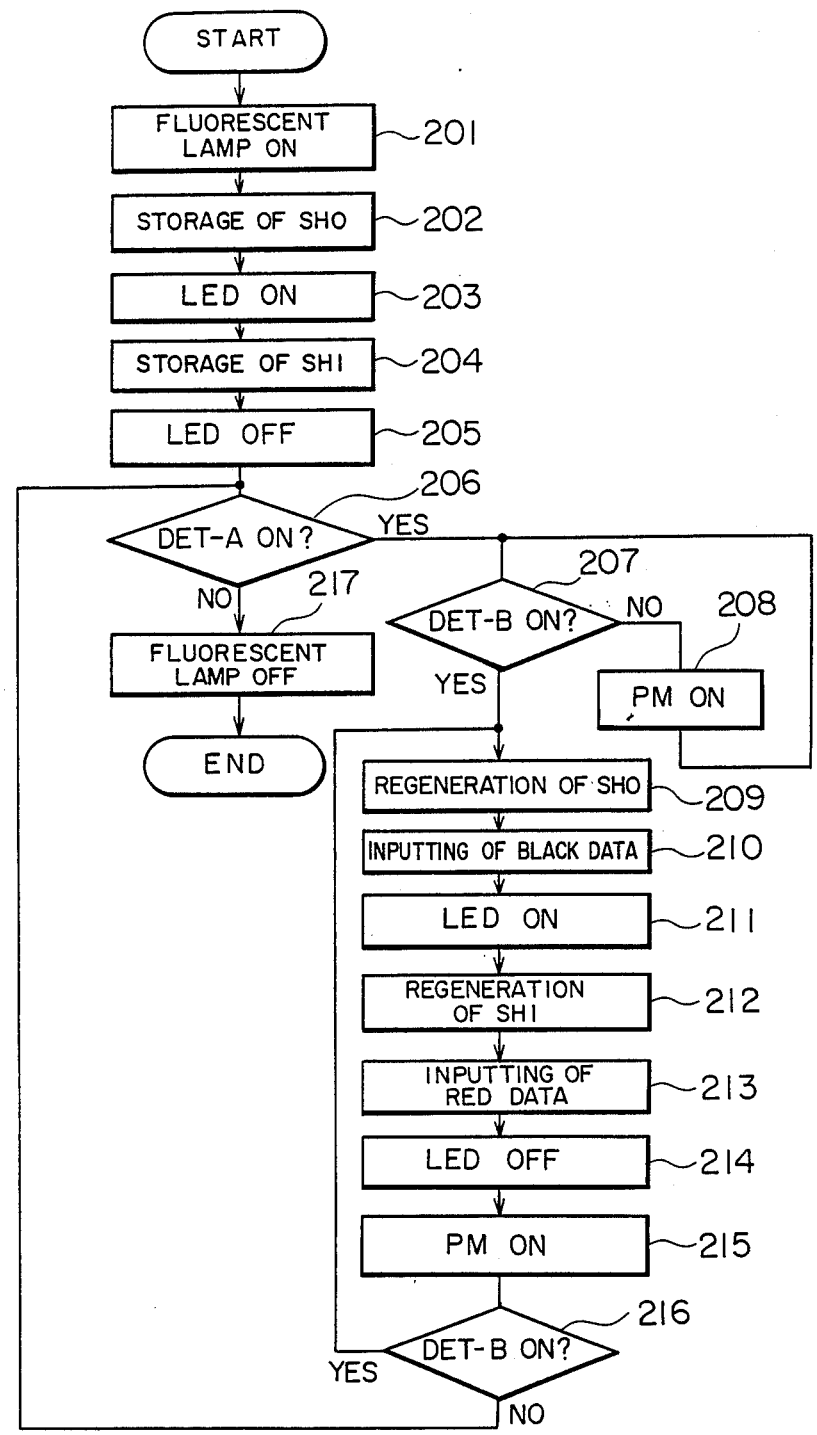
FIG. 2 is a flow chart for illustrating a process of reading operation performed by the reading apparatus according to the invention.

FIG. 2 illustrates in a flow chart a document read processing executed by the system shown in FIG. 1. Referring to FIG. 2, the fluorescent lamp is first lit (step 201). Subsequently, a document supporting plate coloured uniformly in white which also serves as a document feeding plate is read under illumination by the fluorescent lamp 1 only, whereupon the signal waveform outputted from the image sensor 6 is stored as a reference shading waveform SHO for the data in black (step 202). Subsequently, the LED array is lit (step 203), and the corresponding signal waveform produced by the image sensor 6 is stored as a reference shading waveform SHI for the data in red (step 204). The LED array 2 is then turned off (step 205).

Subsequently, presence or absence of a document to be next transmitted is checked at a step 206. This can be accomplished by determining whether a signal DET-A produced by a switch 21 (FIG. 1) actuated in response to the presence of the succeeding document 20 is on (present) or not. When the signal DET-A is on, this means that the document to be transmitted is present. Accordingly, it is then checked whether or not the document 20 is in the reading position at which the document is to be read. This can be realized by determining whether or not a signal DET-B produced by a switch 22 (shown in FIG. 1) actuated in response to the presence of the document at the reading position is on (step 207). When the signal DET-B is off (absent), a motor PM (not shown) for document transportation is driven until the signal DET-B is detected (step 208), to thereby feed the document to the reading position. When the signal DET-B is on, the processing proceeds to a step 209 where the reference shading waveform SHO for the data in black is regenerated to be referred to for correcting the shading distortion for the data in black inputted by reading the document 20 under illumination by the fluorescent lamp 1 (step 210), the level of the data signal undergoing the shading distortion then being determined. For particulars of the shading or distortion correction, reference may be made, for example, to "Image signal processing LSI for facsimile" in "Periodical of The Institute of Electronics And Communication Engineers of Japan", Vol. J68-B, No. 1 (January, 1985) pages 53 to 60.

Next, the LED 2 is lit (step 211), and the reference shading waveform SHI for the data in red is regenerated (step 212). By referring to this reference shading waveform SHI, the shading distortion of the red data signal inputted subsequently is corrected, and is followed by the determination of the level of the resulting red data signal (step 213). Upon completed reading or inputting of the red data, the LED array 2 is turned off (step 214). Subsequently, the motor is driven by one step to feed the document by a predetermined distance (step 215), whereupon it is checked with the aid of the signal DET-B whether the reading operation of the document has been completed (step 216). More specifically, when the signal DET-B is in the on-state, it is decided that the reading of the document has not yet been completed, whereon the step 209 is resumed, being followed by the repeated execution of the sequence up to the step 215. On the other hand, when the signal DET-B is off (absent), a decision is made that the read operation of the document has been completed. Then, the processing returns to the step 206 where it is decided whether or not a document next to be transmitted is present or not. In case the next document is present, the step 207 is regained, whereupon the sequence or routine of the steps 209 to 216 is repeated. Otherwise, the fluorescent lamp 1 is turned off (step 217). The document reading operation thus comes to an end.

FIG. 3 is a timing diagram for illustrating a sequence of the operations involved in the document reading operation described above. In succession to the feeding or transportation of a document by driving the motor with a trigger signal (c), the document reading operation is started when the document read enabling signal DET-B is detected, as shown as (f) in FIG. 3.

As first the fluorescent lamp is lit as shown at (e) and the reference shading waveform SHO to be referred to when the data in black is read is regenerated. Next, a line synchronizing signal (a) is generated to read the data in black (b). Then, the LED array is turned on, as shown at (d), the reference shading waveform SHI to be consulted upon reading the data in red is regenerated and the data in red is read as shown at (b). Subsequently, the LED is turned off upon completion of the document read operation for one line. Then, the motor trigger signal (c) is again activated for feeding the document by the inter-line distance, whereupon the data reading operation is performed for the next line of the document by repeating the operation sequence mentioned above.

In this manner, the document read operation is repeated on a line-by-line basis as long as the document is resident at the reading region.

As will be understood from the above description made by reference to the flow chart and the timing chart shown in FIGS. 2 and 3, respectively, it is required to regenerate two reference shading waveforms for each line since reading of the data is performed twice, i.e., the black data and the red data are read in succession during a period for reading the data of one line. Stated in another way, reference shading waveforms must be regenerated twice for each line of the document once for black data and once for red data.

However, it should be mentioned that when the reading sequence is executed such that the reading of data in black and the reading of data in red are performed respectively for one line, and then the reading of data in red and the reading of data in black are performed respectively for the next line (i.e., in an order opposite the reading order of the preceding line), the regeneration of the reference shading waveform need not be executed twice for every line but rather regeneration of the reference shading waveform only once per line is sufficient.

Figure 4A:
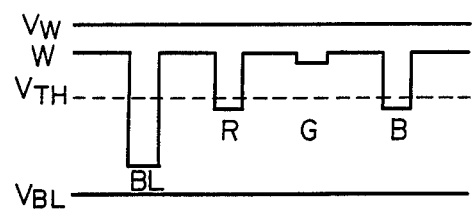
FIGS. 4A, 4B and 5 are diagrams for illustrating colour separating methods carried out by the reading apparatus according to the invention.
Figure 4B:
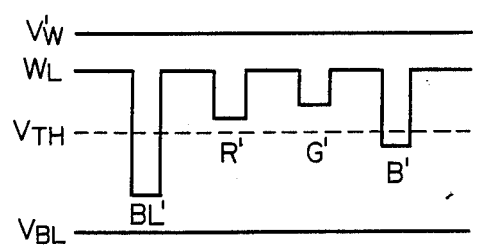

FIGS. 4A and 4B illustrate the concept underlying the colour separation. More particularly, FIG. 4A shows signal waveforms produced upon reading data in red (R), green (G), blue (B) and black (BL), respectively, under illumination with a green fluorescent lamp. In the figure, $V_W$ represents the white level corresponding to a wholly white sheet, while $V_{BL}$ represents the black level corresponding to a wholly black sheet. All the levels of the data signals resulting from a document lie between $V_W$ and $V_{BL}$. A level W represents the ground colour density of the document, and $V_{TH}$ represents a threshold level for binary coding. A level higher than the threshold level represents that the corresponding data is white, while a level lower than the threshold level $V_{TH}$ indicates that the corresponding data is coloured. In FIG. 4A, the green level G is higher than the threshold level. This is because the green fluorescent lamp is employed.

In the case illustrated in FIG. 4B, illumination in red by the LED array is employed in addition to the illumination by the fluorescent lamp. As can be seen, the white level $V_W$, and the red level (R) are higher as compared to FIG. 4A. However, the increase in the black level BL', green level (G') and the blue level (B') is not as significant.

Figure 5:
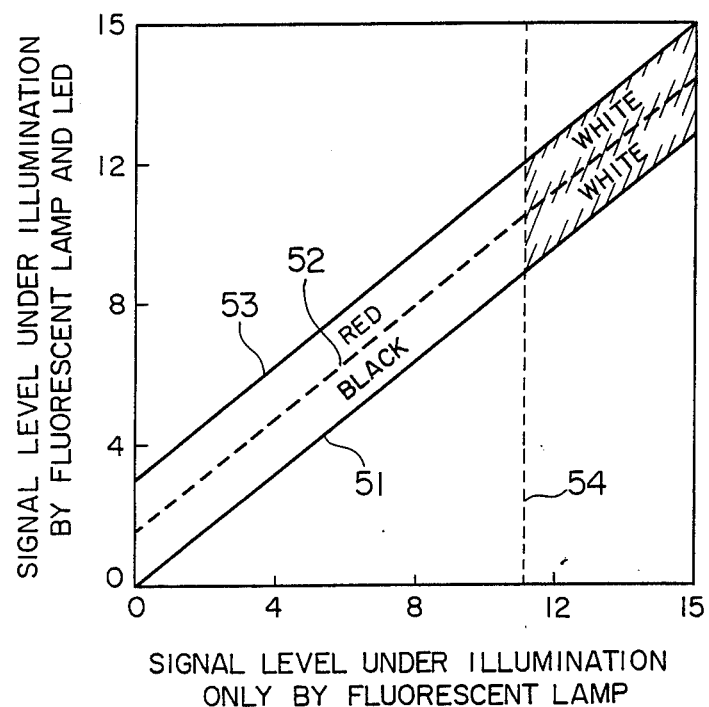

Referring to FIG. 5 in which the signal level under simultaneous illumination by both the fluorescent lamp and the LED array is taken along the ordinate with the signal level under illumination only by the fluorescent lamp being taken along the abscissa. In this figure, a solid line 51 indicates that the quantity of light undergoes no change even when the illumination by the LED array is added, while a solid line 53 indicates that the quantity of light is increased by addition of the illumination with the LED array. In FIG. 5, the maximum quantity of light in each illumination is standardized so as to correspond to the maximum value of the signal level. Consequently, the signal level of "15" attained under illumination only by the fluorescent lamp may assume a level, for example, of "13" under illumination by both the fluorescent lamp and the LED array. The loss corresponding to the difference of "2" in the signal level indicates that the illumination by the LED array is not reflected additively onto the image sensor output signal because of absorption of the red light component.

As can be seen in FIG. 5, it is possible to separate red and black signals by making use of a boundary such as the boundary established between the solid line curves 51 and 53 with distances therefrom proportional to the quantities of light of the fluorescent lamp and the LED array, respectively, as indicated by a broken line 52. In this manner, separation between white and red components as well white and black components can be effectuated by making use of a threshold value such represented by a broken line 54.

Figure 19:
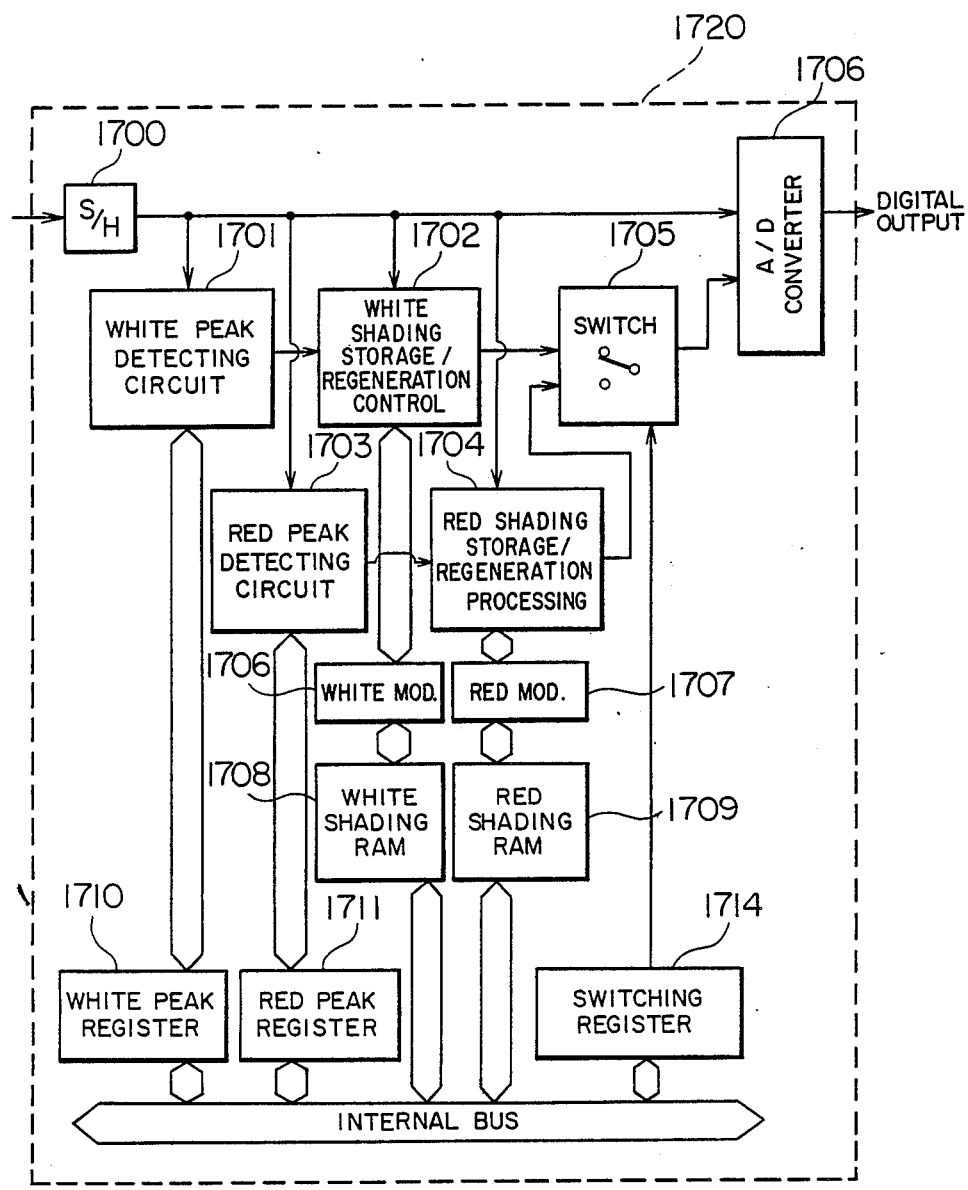
FIG. 19 is a view showing a structure of a distortion correcting LSI circuit according to an embodiment of the present invention.

FIG. 19 shows a structure of a distortion correcting LSI 1720 designed for two-colour facsimile equipment. A shading signal derived by reading a colour standard by the image sensor is sampled by a sample and hold (S/H) circuit 1700 to be subsequently inputted to an analogue-to-digital or A/D converter 1706. On the other hand, a white peak detector 1701 detects the peak level of illumination only by the fluorescent lamp (white), while a red peak detector 1703 detects the peak level of the illumination by both the fluorescent lamp and the LED array (red). More specifically, the white peak level is detected by reading a plate or sheet in white under illumination with only the fluorescent lamp, while the red peak level is detected by reading the same white plate under simultaneous illumination by both the fluorescent lamp and the LED array. The white and red peak levels are utilized for the peak control performed when the white shading waveform SHO and the red shading waveform SHI are regenerated through a white shading storage/regeneration processing circuit 1702 and a red shading storage/regeneration processing circuit 1704, respectively.

The output signal of the sample and hold circuit 1700 is additionally supplied to the white shading storage/regeneration processing circuit 1702 and the red shading storage/regeneration processing circuit 1704 to undergo A/D conversion for subsequent data compressions by a white modulator 1706 and a red modulator 1707, respectively, the results of the data compressions being stored in a white shading RAM (random access memory) 1708 and a red shading RAM 1709, respectively. The white shading waveform and the red shading waveform are inputted on a time-serial basis, as described hereinbefore in conjunction with the steps 202 and 204 shown in FIG. 2.

When a document is being read by the image sensor under illumination with the fluorescent lamp, the signal from the white shading RAM 1708 is extended by the white modulator 1706 and undergoes adjustment of the peak level and D/A conversion in the white shading storage/regeneration processing circuit 1702 to be subsequently inputted to the A/D converter 1706 as the white reference level by way of a switch 1705. On the other hand, when the document is read under illumination with both the fluorescent lamp and the LED, the white reference level is generated through the similar processing by the red modulator 1707 and the red shading storage/regeneration circuit 1704 to be inputted to the A/D converter 1706 as the white reference level by way of the switch 1705.

The change-over of the switch 1705 is effected under the control of a switching register 1714. In that case, the change-over of the switch 1705 may be performed at the timing corresponding to the steps 210 and 213 when the black and red data are serially inputted on the line-by-line basis as described hereinbefore by reference to FIG. 2. Alternatively, the switch 1705 may be changed over such that the black data is first transmitted, being followed by transmission of the red data on a page-by-page basis of the documents. In any case, the command to the switching register 1712 may be issued by an external microprocessing unit (MPU) or alternatively by an appropriate internal circuit in an automatic manner.

In the A/D converter 1706, the white reference level inputted thereto through the switch 1705 and a black reference level prepared separately are utilized as the highest and lowest level references, respectively, for determining relative levels of the black and red data signals inputted directly from the circuit 1700 (at the steps 210 and 213 in FIG. 2, respectively), wherein the relative levels thus determined are converted into corresponding digital values. On the basis of both the signal levels, discriminative colour identification is performed through the processing described hereinafter. At this juncture, it should be mentioned that the black reference level may be preset internally of the converter 1706 or alternatively the black reference level may be supplied externally from a memory (not shown).

The multi-colour data transmission can be carried out in the manner described above in principle. However, there remain two important problems to be solved. One is concerned with the accuracy. More specifically, there are commonly employed sixteen levels to be handled in the facsimiles. Further, the luminance of light emitted by the LED is in as low a range as one fifth of that of the fluorescent lamp. As the consequence, the number of the levels which can be made use of in the colour separation is only one or two, making unavailable any margin in the colour identification or discrimination. Thus, when reflection of a red light component from, for example, a region in which gray becomes significant in the read operation under illumination with the LED array, a false colour discrimination may be made such that the gray region is erroneously taken for the red region. In particular, such erroneous determination is most likely to be made upon reading of the surroundings of characters and thin lines.

The above problem may be solved by increasing the number of the levels available in the reading operation, which however results in an untolerable increase in the cost of the equipment.

Figure 6A:
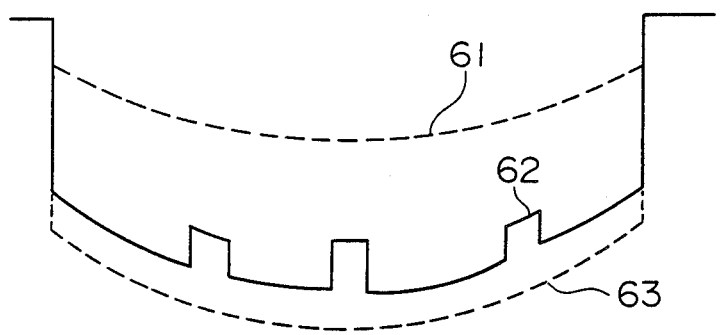
FIGS. 6A to 6B are diagrams for illustrating a colour separating method according to another embodiment of the invention.
Figure 6B:
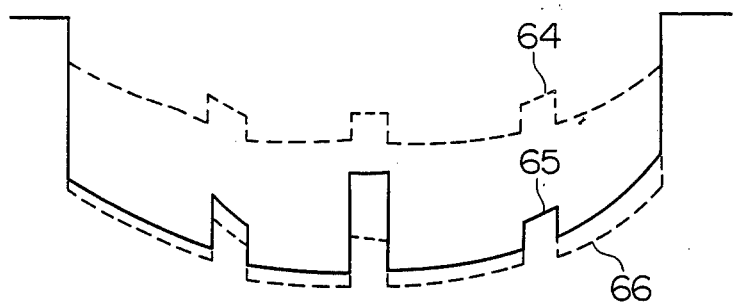

Under the circumstances, a scheme illustrated in FIGS. 6A and 6B is adopted according to a teaching of the present invention. More specifically, the reading sequence described hereinbefore by reference to FIGS. 2 and 3 is modified so that data 62 is read at the start of the period for reading one line under illumination by both the fluorescent lamp and the LED array, as is illustrated in FIG. 6A. At that time, as a shading waveform 63 to serve as the wholly white reference level, the data is employed which is obtained by reading a white plate in precedence to the reading of document under illumination by both the fluorescent lamp and the LED array. In FIG. 6A, a broken line 61 represents the wholly black reference level and corresponds to a quotient resulting from the division of the wholly white reference level 63 by a certain constant.

Next, the LED array is turned off, as is illustrated in FIG. 6B, and the data 62 as read previously are written as the shading waveform 66 to serve as the wholly white reference level. Consequently, the wholly black reference level determined from the waveform 66 assumes a waveform such as the waveform 64. In this state, the document read signal is inputted to determine the level of the data signal by reference to the waveforms 66 and 64, which level then assumes the waveform designated by a numeral 65. In this manner, change in the signal resulting from the turn on and off of illumination by the LED can be magnified to ensure an improved accuracy of the colour-dependent read operation.

The other problem involved in realization of the colour separation in the facsimile apparatus can be seen in that the light emission characteristics of the fluorescent lamp and the LED vary as a function of temperature.

FIG. 7 graphically illustrates the light emission characteristics of concern, wherein the time lapse from the lighting is taken along the abscissa with the relative luminances of the fluorescent lamp and the LED being taken along the ordinate. Referring to the figure, the relative luminance of the fluorescent lamp changes as indicated by a solid line curve 72, while that of the LED changes in such a manner as indicated by a broken line curve 71. Thus, there may arise falsified colour determination due to this difference in luminance. More particularly, a low temperature prevails immediately after the power-on of the LED and the fluorescent lamp. In this state, although the LED operates with a high emission efficiency, the fluorescent lamp is at a low output level. As the time elapses with the temperature being progressively increased, the light emission efficiency of the LED array is lowered while the output light level of the fluorescent lamp temporarily increases. In due course of time, both the light sources become stable. Additionally, it is noted that the facsimile equipment is often used in the state in which the LED and the fluorescent lamp are both in an unstable state. In the case of the monochromatic facsimile, the above-mentioned problem can be solved simply by controlling the quantity of light so as to be constant in the reading operation. However, in the two-colour facsimile, the parameters for the colour separation must also be controlled correspondingly.

Figure 8:
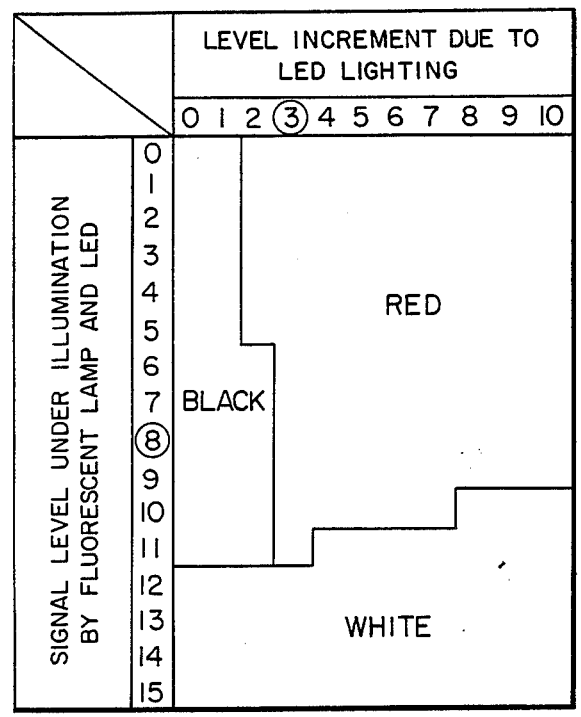
FIG. 8 is a chart illustrating the standards for colour discrimination in the case two different light sources are employed.

FIG. 8 shows an example of a colour separation reference table to be referred to upon discrimination or identification of colours. This table is prepared so that colours can be discriminately identified in dependence on the signal level obtained under illumination by both the fluorescent lamp and the LED and the increment in the signal level (decrement in case the standardization illustrated in FIG. 5 is adopted). A number of such tables are prepared in consideration of the ratio in the quantity of light between the fluorescent lamp and the LED which varies as a function of the temperature as described above. The tables thus prepared are changed over from one to another so that correct colour identification can be realized constantly.

Figure 9A:
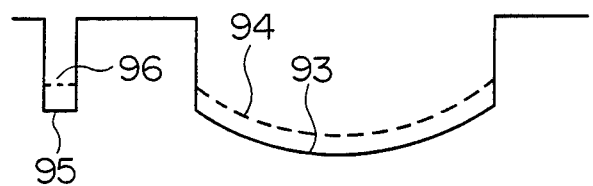
FIGS. 9A and 9B are views for illustrating a method of detecting the quantity of light emitted by light sources.
Figure 9B:
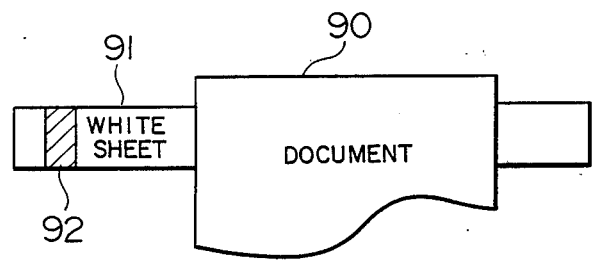

Methods of detecting the quantities of light emitted by the fluorescent lamp and the LED array will now be described by referring to FIGS. 9A and 9B, in which FIG. 9A shows, by way of example, a signal obtained in the document reading operation based on a teaching of the present invention. As is shown in FIG. 9B, a region 92 of a colour to serve as the reference for the colour separation is provided on a white plate 91 outside of the region where the document can be read. When a document 90 is inserted in the facsimile equipment, the reading operation is of course performed for the document. However, when the document 90 is absent, the white plate 91 is read for generating the shading waveform and other. In FIG. 9A, reference numerals 93 and 95 designate signals resulting from reading of the white plate 91 and the reference colour 92, respectively, under illumination by both the fluorescent lamp and the LED array, and numerals 94 and 96 designates signals derived from the reading of the white plate 91 and the reference colour 92, respectively, under illumination only by the fluorescent lamp. It is possible to establish the criterion for the colour discrimination on the basis of the change in the level between the signals 95 and 96. Further, the curves 93 and 94 represent the shading waveforms under illumination with both the light sources and the fluorescent lamp alone, respectively. The detection of these signals can be achieved in the manner described hereinbefore.

In utilizing the two colour facsimile equipment, it is an important problem from the viewpoint of the manufacturing cost to determine in what type of structure the recorder is to be implemented. For example, in utilizing facsimile equipment which is imparted with two colour reading capability and in which the recording must however be performed simply in one colour. It goes without saying that, even in monochromatic (one-colour) recording, the image data transmitted as separated in two colours must be discriminated or identified on a colour base.

Figure 10:
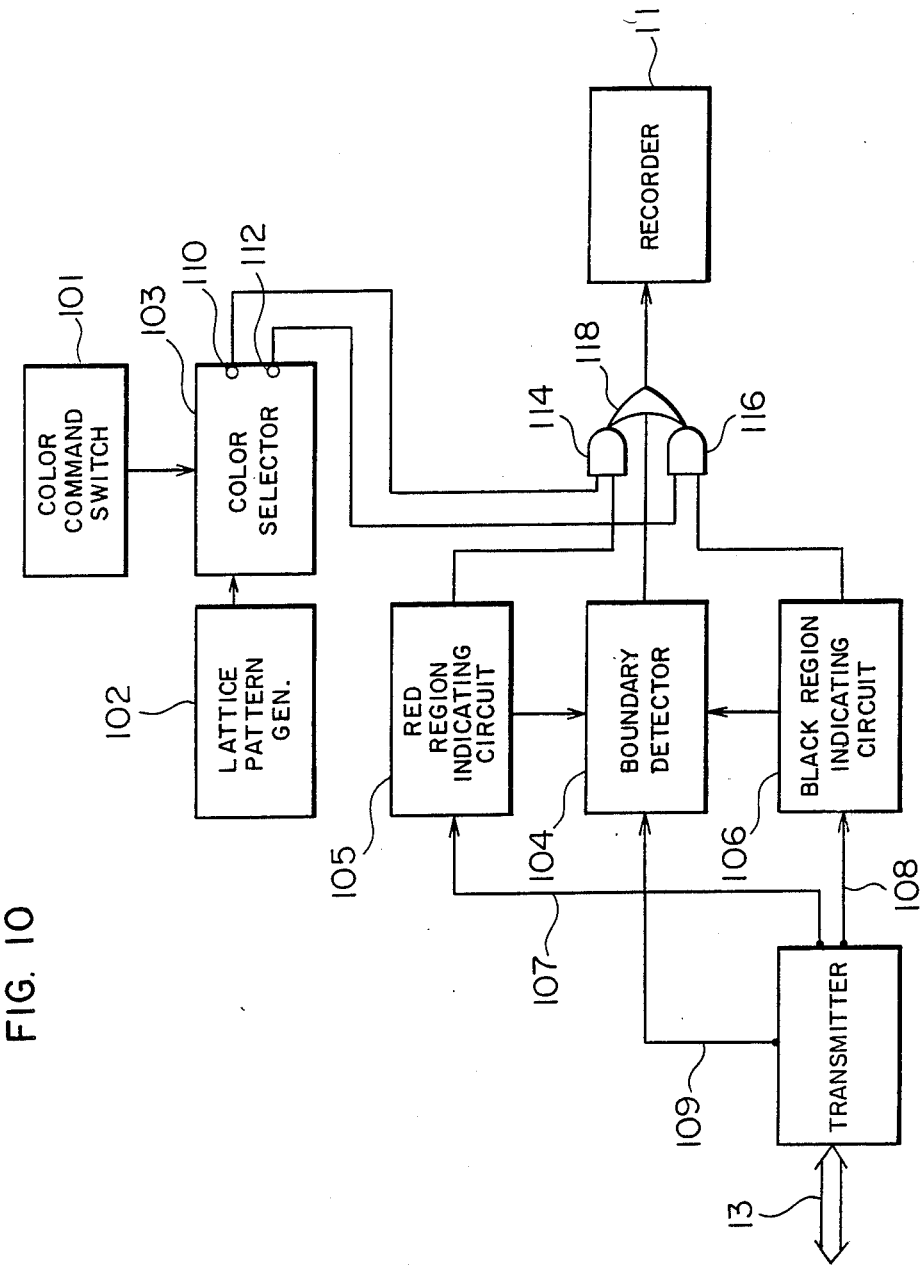
FIG. 10 is a flow chart illustrating a process for recording document data of different colours discriminately with different monochromatic patterns in a monochromatic facsimile.
Figure 11:
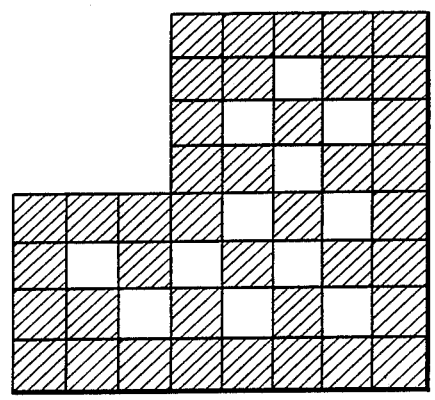
FIG. 11 is a chart showing an example of a monochromatic display generated through the process illustrated in FIG. 10.

FIG. 10 shows an exemplary embodiment of a recorder of monochromatic (white and black) facsimile equipment for recording the picture or video data sent thereto, being separated in two colours of red and black, in a monochromatic pattern. In the case of the illustrated embodiment, it is assumed that the region in black of the picture as received is printed in black dots over the whole region while the region in red is printed in black dots in a lattice-like pattern except for the boundary portion of the red region, as is illustrated in FIG. 11.

Now referring to FIG. 10, upon reception of an incoming colour-separated picture signal sent from a transmitter such as the transmitter 10 shown in FIG. 1, the red signal is supplied to a red region indicating circuit 105 with the black signal being furnished to a black region indicating circuit 106. Since the boundary is necessarily recorded in the black dots, data 109 to be recorded is supplied to a boundary detecting circuit 104. A lattice pattern generator 102 generates "1" and "0" signals alternately with a timing corresponding to the lattice constant. A reference numeral 101 denotes a colour commanding switch for commanding which of the red data or the black data is to be printed in the lattice pattern. When the red signal is selected by the colour designating switch 101, a colour selector 103 connects the input thereto from the lattice pattern generator 102 to an output terminal 110 which is connected to one input terminal of a AND gate 114 for the red signal, resulting in that the AND gate 114 is enabled (on) and disabled (off) periodically at the interval corresponding to the lattice constant. On the other hand, one input of an AND gate 116 for the black signal is continuously supplied with the signal "1" from the other output terminal 112 of the colour selector 103, whereby the AND gate is continuously held in the on-state. It goes without saying that the situations mentioned above are reversed when the black signal is commanded to be printed in the lattice pattern. By virtue of the arrangement described above, the red signal supplied to the other input of the AND gate 114 for the red signal from the red region indicating circuit 105 is sent intermittently to the recorder 11 through the AND gate 114 and an OR gate 118, whereby the region originally in red is printed in the lattice pattern. On the hand, the black signal applied to the other input of the AND gate 116 from the black region indicating circuit 106 is continuously transferred to the recorder 11 through the AND gate 116 and the OR gate 118, whereby the region originally in black is printed in the black dots of a high density. Since the boundary of the red region is necessarily printed, the red signal supplied to the red region indicating circuit 105 is applied to the boundary detector 104, whereby portions of the data to be recorded corresponding to the leading end and the trailing end of the red signal, respectively, are extracted to be sent to the recorder 11 through the OR gate 118. Thus, the boundary is printed out without fail.

In a practical application of the recorder described above, a restriction may be adopted such that specific data or characters are to be written in thick red by using, for example, a felt-tip pen of red ink. In that case, only the data or character written in red are recorded in the black lattice patterns to be visually perceived in gray by the addressee discriminately from the other characters each printed wholly in black. Conversely, when a received document is to be sent back with comments inserted therein in red so that the comments in red may attract attention of the original addresser, the comments in red may be printed out each in black wholly with the character in black being printed in the lattice pattern.

Now, description will be turned to exemplary embodiments of the facsimile system implemented on the basis of the concept elucidated above.

Figure 15:
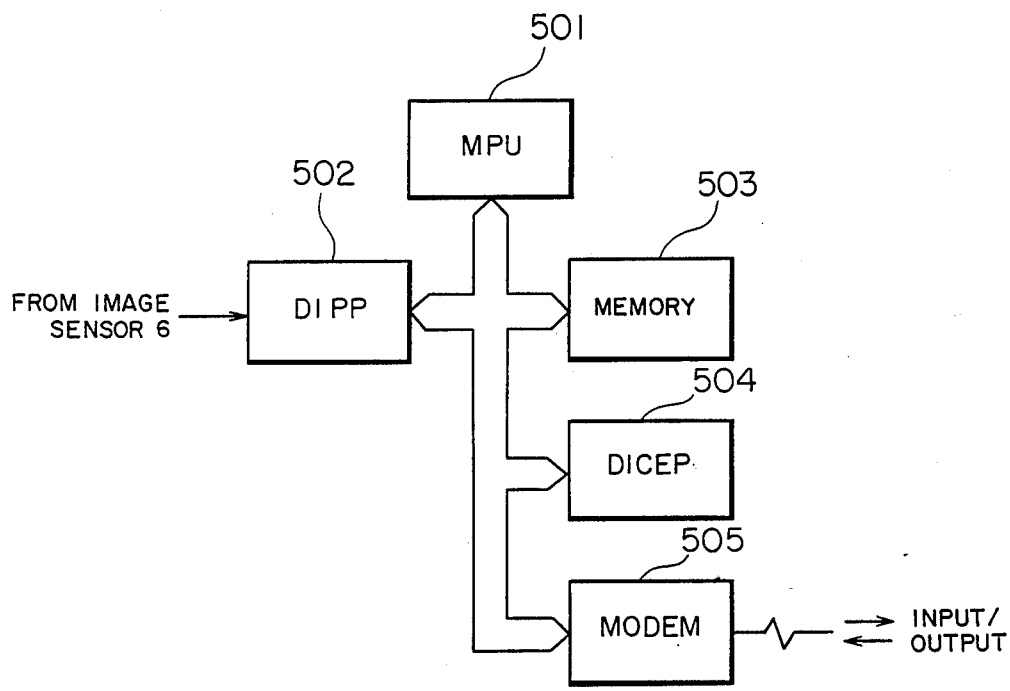
FIGS. 15, 16 and 18 are views showing basic structures of the distortion correcting circuits according to the invention implemented in software.

Referring to FIG. 15 showing schematically system arrangement of the facsimile in terms of software, two types of shading waveforms are previously stored in a memory 503 and loaded in a shading memory incorporated in a shading correction LSI-DIPP 502 of such structure as shown in FIG. 19 through a multiprocessing unit (MPU) 501. Picture or video data as inputted is coded by a coding/decoding LSI-DICEP 504 to be transmitted through a modem MODEM 505.

Figure 16:
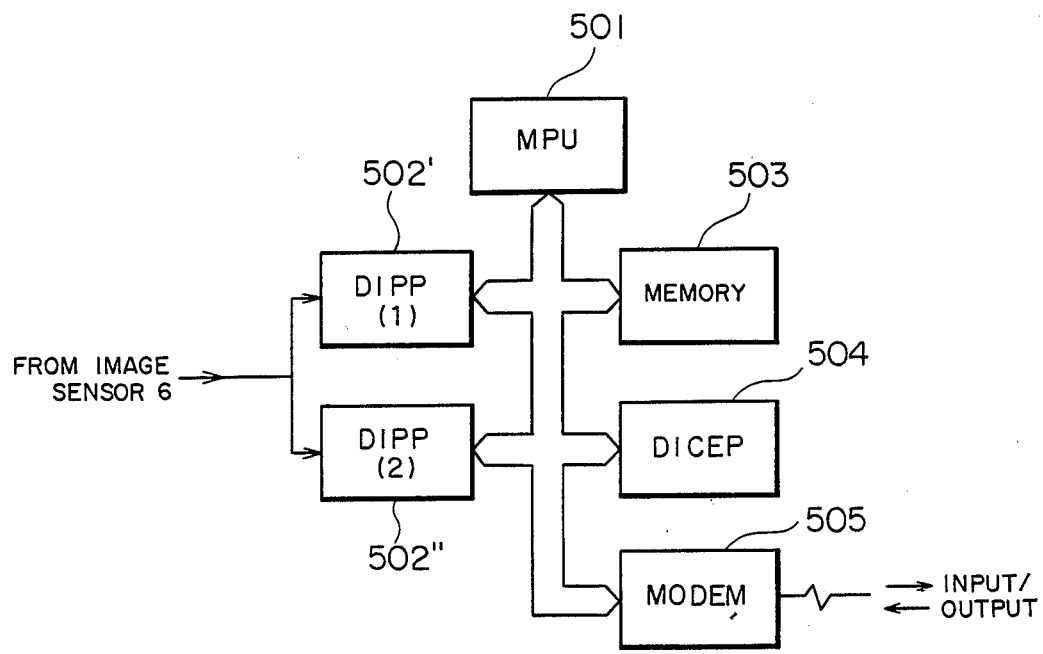

FIG. 16 shows functionally another embodiment of the facsimile in which two shading correction LSI-DIPP 502' and 502" are used for storing previously different shading waveforms in the respective memories so that either one of two shading waveforms can be read out in the subsequent processing by the MPU 501. Except for this respect, the system arrangement shown in FIG. 16 is same as the one shown in FIG. 15.

Figure 17:
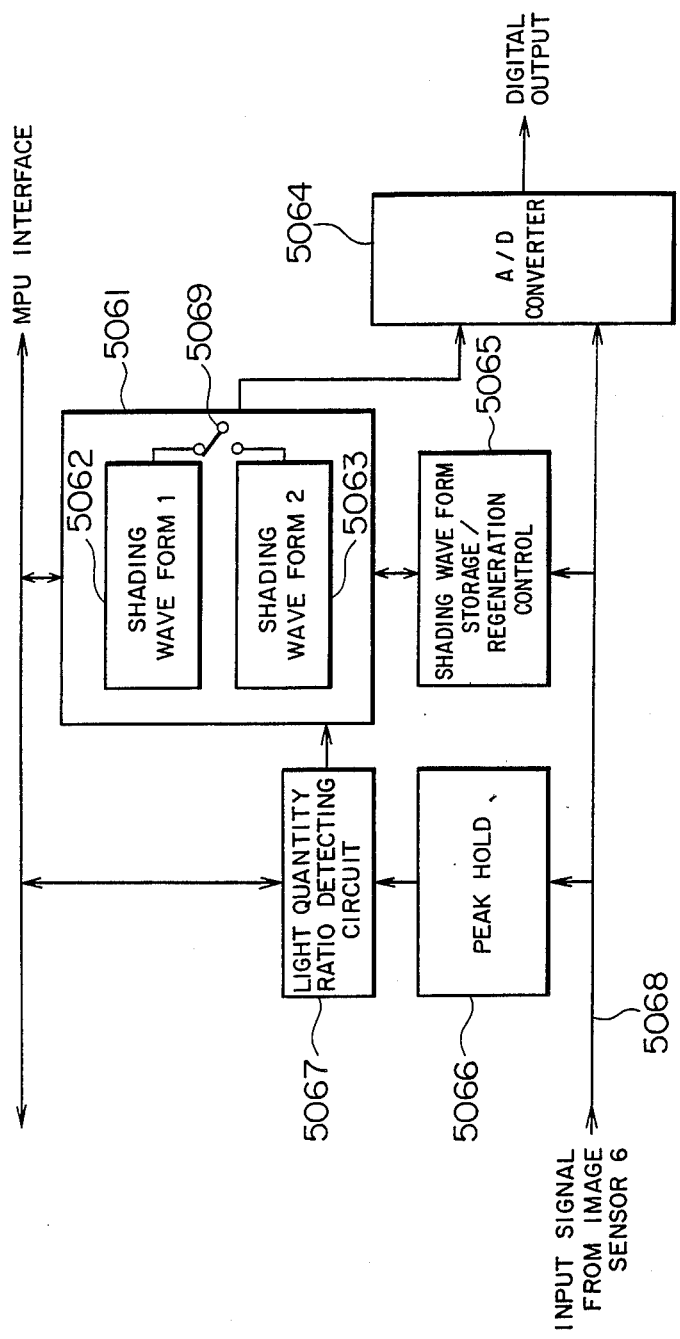
FIG. 17 is a view showing a structure of the correction circuit including a plurality of shading waveform memories.

FIG. 17 shows in a functional diagram still another embodiment of the invention according to which a plurality of shading memories are provided in view of the disadvantage of the prior system in which the shading correction LSI includes only one shading memory.

The input signal 5068 from the image sensor 6 is applied to a peak hold circuit 5066 for the purpose of determining the quantity of light. More specifically, quantities of light under illumination by the different light sources (i.e. fluorescent lamp and LED), respectively, are held in the peak hold circuit 5066. On the basis of the quantities of light as placed in the peak hold circuit, the light quantity ratio is arithmetically determined by a light quantity ratio detecting circuit 5067, the result of which is messages to the MPU by way of a MPU interface bus.

On the other hand, a shading waveform is derived from the input signal 5068 and loaded in the shading memory 5061 through a shading waveform storage/regeneration control circuit 5065. The shading memory 5061 includes two waveform memories 5062 and 5063, for waveforms-1 and -2, respectively. By changing over these waveform memories by means of a change-over switch 5069, the corresponding shading waveform is supplied to an A/D converter 5064.

Figure 18:
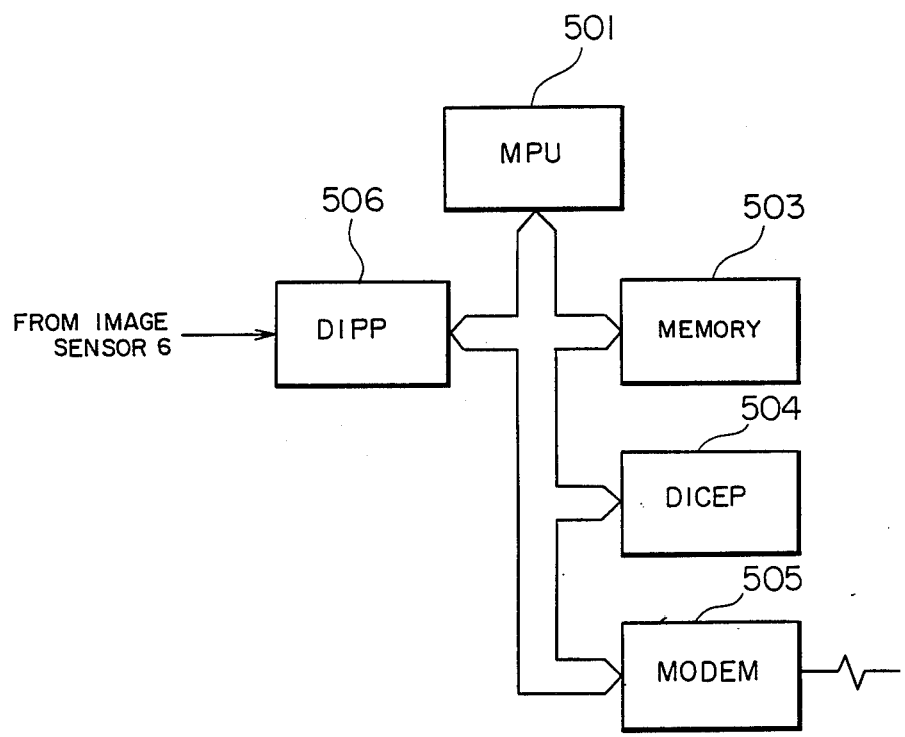

FIG. 18 shows only functionally a facsimile system in which the LSI-DIPP 506 of the structure as the shading correction DIPP. Except for this difference, the system structure is same as that shown in FIG. 15. It should however be noted that in the system shown in FIG. 18, the change-over of the shading waveform is performed by the DIPP 506 itself without requiring any intervention of the MPU 501. Thus, significant improvement of the system performance can be assured.

In this manner, practical two-colour facsimile equipment can be realized at low cost.

The LSI-DIPP for document data preprocessing is described in detail in No. JP-A-60-94576. The document data coding and decoding LSI-DIPP is described in detail in No. JP-A-56-126368. Accordingly, detailed description of these LSIs will be omitted here. For particulars, reference may be made to the abovementioned publications.

Figure 12:
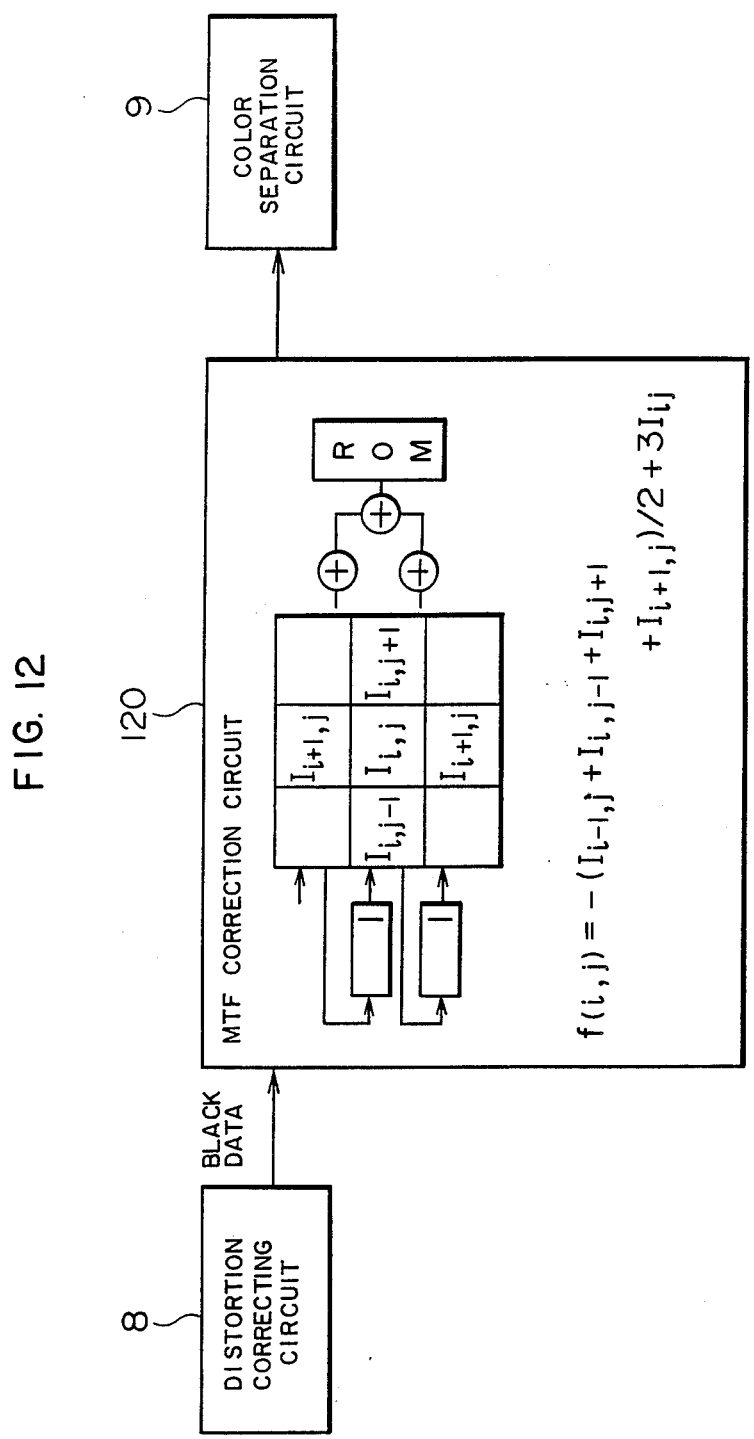
FIG. 12 is a view illustrating a processing for preventing erroneous colour discrimination in a gray region surrounding a character.

Referring to FIG. 12, description will next be made of the means for preventing erroneous colour identification of the gray region surrounding the character. An MTF correcting circuit 120 is provided for processing the black data 8 supplied from the distortion correcting unit 8. In this processing, black data $I_{i,j}$ of a given pixel (i, j) having undergone no processing is corrected by using the black data $I_{i-1,j}$; $I_{i,j-1}$; $I_{i,j+1}$; $I_{i+1,j}$ of the pixels surrounding the given pixel in accordance with $$f_{(i,j)} = 3I_{i,j} - \tfrac{1}{2}(I_{i-1,j} + I_{i,j-1}, I_{i,j+1}, I_{i+1,j})$$

for thereby obtaining the corrected black data $f_{(i,j)}$. By virtue of this processing, the gray region surrounding the character presents either white or black data, allowing the erroneous colour identification to be significantly suppressed.

Figure 13:
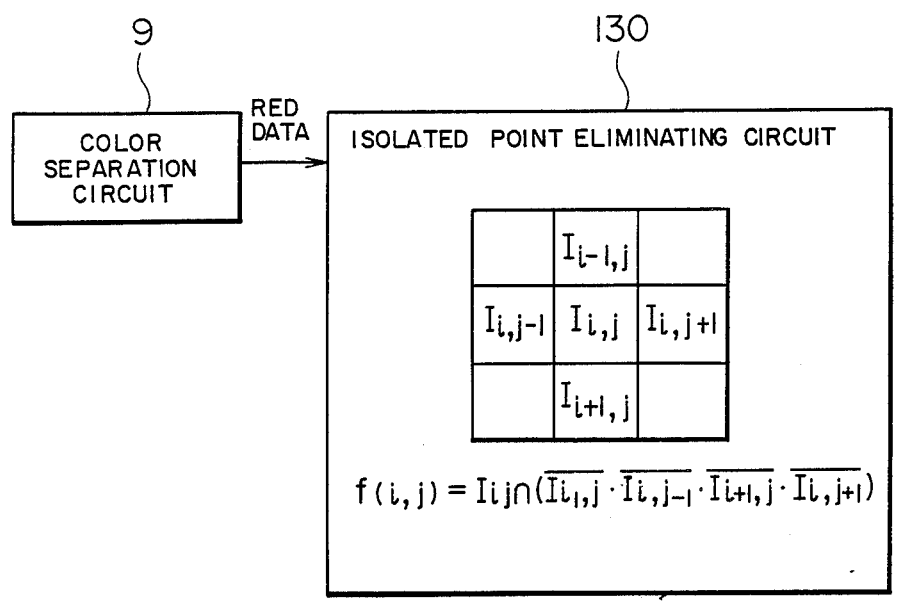
FIG. 13 is a view showing a circuit configuration for eliminating an isolated point in the colour identification signal.

It is further noted that erroneous colour identification may often be made for the red region represented by the output signal of the colour separation circuit 9 when the red region is an isolated point. FIG. 13 shows an isolated point eliminating circuit 130 provided to exclude such erroneous colour identification. This circuit 130 is designed to process the red data $I_{i,j}$ of a given pixel (i,j) by using the red data $I_{i-1,j}$; $I_{i,j-1}$; $I_{i,j+1}$; $I_{i+1,j}$ of the pixels surrounding the given one in accordance with $$f_{(i,j)} = I_{i,j} \cap (I_{i-1,j}, I_{i,j-1}, I_{i,j+1}, I_{i+1,j})$$

When all the red data of the surrounding pixels are "0", the processed red data $f_{(i,j)}$ is "0" even if the corresponding red data $I_{i,j}$ before being processed assumes the value of "1".

By combining the circuits shown in FIGS. 12 and 13, the colour separation can be executed more reliably and stably.

As will be understood from the foregoing description, a stable colour separation can be realized because the quantities of light for illumination can be utilized as parameters for the colour separation even in the course of document reading.

We claim:

1. A multi-colour document reading apparatus for reading a document, disposed at a predetermined position and containing a multi-colour representation, on a line-by-line basis while discriminately identifying the colours of the multi-colour representation, comprising:

an image sensor for sensing optical images in a predetermined area including at least one line on said document disposed at said predetermined position;

light source means for selectively illuminating at least said predetermined area in one of first and second energized states, the first energized state having different spectral characteristics than the second energized state;

switch means for selectively energizing said light source means for illuminating said document in one of said first and second states;

distortion correcting means including memory means for storing first and second shading waveforms derived from data sensed by said image sensor for optical images corresponding to a standard sheet having a specific colour disposed at said predetermined position and illuminated by said light source means in said first and second energized states, respectively, means for reading out said first and second shading waveforms from said memory means before said document is read by said image sensor on the line-by-line base, correcting means for correcting first and second line data detected by said image sensor from an optical image on one line of said document illustrated by said light source means in said first and second states in accordance with said first and second shading waveforms read out from said memory means, respectively; and colour separating means for discriminately identifying different colours of the multi-colour representation included in said one line of said document for generating colour-separated signals representing the different colours.

2. A multi-colour document reading apparatus according to claim 1, wherein said switch means changes over energization of said light source means such that said light source means assumes one of said first and second states whenever a period during which one line of said document is read is started and assumes the other state at the end of said period.

3. A multi-colour document reading apparatus according to claim 1, wherein said switch means changes over energization of light source means such that the state assumed by said light source means at the end of a period in which one line on said document is read is the same as the state assumed by said light source means at the start of a period in which a succeeding line is read.

4. A multi-colour document reading apparatus according to claim 1, wherein the standard sheet is coloured in white.

5. A multi-colour document reading apparatus according to claim 4, wherein said first data detected from one line on said document in said first state of said light source means is used as said second shading waveform.

6. A multi-colour document reading apparatus according to claim 1, further including means for determining a ratio between the quantity of light emitted by said light source means in said first state and the quantity of light emitted by said light source means in said second state, said ratio being used for said discriminate colour identification.

7. A multi-colour document reading apparatus according to claim 1, further comprising means for determining a ratio between the quantity of light emitted by said light source means in said first state and the quantity of light emitted by said light source means in said second state prior to each line on said document being read, said ratio being used for said discriminate colour identification.

8. A multi-colour document reading apparatus according to claim 1, wherein the standard sheet is provided with an additional colour serving as reference for the discriminate colour identification.

9. A multi-colour document reading apparatus according to claim 8, wherein said additional colour is provided on said standard sheet at a position where said additional colour can be read prior to every reading of one line on said document.

10. A multi-colour document reading apparatus according to claim 9, wherein the standard sheet is disposed outside of a region where said document is read.

11. A multi-colour document reading apparatus according to claim 1, further comprising means for correcting a pixel data related to each pixel of said first line data with the aid of adjacent pixel data, said means for correcting pixel data being interposed between said distortion correcting means and said colour separating means.

12. A multi-colour document reading apparatus according to claim 1, wherein said colour-separated signals generated by said colour separating means comprise a red signal indicating a red colour on said document, and further comprising means for transforming a pixel data of significance corresponding to one pixel of said red signal into data of non-significance when pixel data of all pixels located in a specific positional relation close to said one pixel are of no significance.

13. A multi-colour document reading apparatus according to claim 1, wherein means are provided for storing said first and second shading waveforms separately from each other.

14. A multi-colour document reading apparatus according to claim 1, said light source means including a fluorescent lamp and a light emission diode array, wherein only said fluorescent lamp is energized in said first state while both of said fluorescent lamp and said light emission diode array are energized in said second state.

15. A multi-colour facsimile apparatus including a multi-colour document reading apparatus for reading a document, disposed at a predetermined position and containing a multi-colour representation, on a line-by-line basis while discriminately identifying the colours of the multi-colour representation, comprising:
   an image sensor for sensing optical images in a predetermined area including at least one line on said document disposed at said predetermined position;
   light source means for selectively illuminating at least said predetermined area in one of first and second energized states, the first energized state having different spectral characteristics than the second energized state;
   switch means for selectively energizing said light source means for illuminating said document in one of said first and second states;
   distortion correcting means including memory means for storing first and second shading waveforms derived from data sensed by said image sensor for optical images corresponding to a standard sheet having a specific colour disposed at said predetermined position and illuminated by said light source means in said first and second energized states, respectively, means for reading out said first and second shading waveforms from said memory means before said document is read by said image sensor on the line-by-line basis, correcting means for correcting first and second line data detected by said image sensor from an optical image on one line of said document illustrated by said light source means in said first and second states in accordance with said first and second shading waveforms read out from said memory means, respectively; and
   colour separating means for discriminately identifying different colours of the multi-colour representation included in said one line of said document for generating colour-separated signals representing the different colours,
   said facsimile apparatus further including transmitting means for externally transmitting said colour-separated signals generated by said multi-colour document reading apparatus, and recording means for recording an image represented by said colour-separated signals in one colour.

16. A multi-colour facsimile apparatus according to claim 15, wherein said recording means records data regions of different colours represented by said colour-separated signals in different patterns of one colour.

17. A multi-colour facsimile apparatus according to claim 16, wherein said one colour is black, said different patterns differing in black dot density.

18. A multi-colour facsimile apparatus according to claim 17, wherein said black dot density is changed by dispersing white dots in a black region of one of said different patterns.

19. A multi-colour facsimile apparatus according to claim 18, wherein said white dots are disposed in a lattice-like form within said black region.

20. A multi-colour facsimile apparatus according to claim 19, wherein white dots located on the boundary of said black region are replaced by black dots.

21. A multi-colour facsimile apparatus according to claim 17, the different colours of said document being black and red, wherein both black and red regions are recorded in black dots while the red region is recorded with a lower density of the black dots than the black region.

22. A multi-colour facsimile apparatus according to claim 17, the different colours of said document being black and red, wherein both black and red regions are recorded in black dots and the black region is recorded with a lower density of the black dots than the red region.

23. A multi-colour facsimile apparatus according to claim 15, wherein said first and second shading waveforms are serially read out upon each reading of a line of said document on a line-by-line basis.

24. A multi-colour document reading apparatus according to claim 1, wherein said multi-colour document reading apparatus is included in a facsimile apparatus.

25. A multi-colour document reading apparatus according to claim 1, wherein said distortion correcting means is a semiconductor integrated circuit.

* * * * *